United States Patent
Nakamura et al.

(10) Patent No.: US 6,450,392 B1
(45) Date of Patent: Sep. 17, 2002

(54) GROOVE SHAPE FOR SINGLE BUTT WELDING AND INSPECTION METHOD OF WELD ZONE THEREOF

(75) Inventors: Koji Nakamura; Yutaka Kimura, both of Tokyo (JP)

(73) Assignee: Nippon Sanso Corporation, Tokyo (JP)

(*) Notice: Subject to any disclaimer, the term of this patent is extended or adjusted under 35 U.S.C. 154(b) by 0 days.

(21) Appl. No.: 09/584,126

(22) Filed: May 31, 2000

(30) Foreign Application Priority Data

Jun. 3, 1999 (JP) .......................................... 11-157146

(51) Int. Cl.$^7$ .............................................. F16L 13/02
(52) U.S. Cl. ........................................ 228/104; 403/271
(58) Field of Search ................................. 228/104, 166, 228/167, 168, 169; 219/61, 125.12, 60 A, 60 R, 125.1; 428/683; 403/271, 272

(56) References Cited

U.S. PATENT DOCUMENTS

| | | | |
|---|---|---|---|
| 3,922,517 A | * | 11/1975 | Nelson et al. |
| 4,110,589 A | * | 8/1978 | Koshiga et al. |
| 4,142,085 A | * | 2/1979 | Knipstrom et al. |
| 4,209,123 A | * | 6/1980 | Jay |
| 4,255,641 A | * | 3/1981 | Connell et al. |
| 4,320,277 A | * | 3/1982 | Taira et al. |
| 5,030,812 A | * | 7/1991 | Sugitani et al. |
| 5,599,469 A | * | 2/1997 | Yoshino |
| 5,750,955 A | * | 5/1998 | Yoshino |

* cited by examiner

Primary Examiner—M. Alexandra Elve
Assistant Examiner—Jonathan Johnson
(74) Attorney, Agent, or Firm—Merchant & Gould P.C.

(57) ABSTRACT

A groove shape and an inspection method capable of securely recognizing existence of a weld flaw of a single butt weld zone by a nondestructive inspection, such as a radiograph test or an ultrasonic test, are provided. A groove shape where a concave portion 5 is formed on a butt surface 1b and a butt surface 2b of pipes 1, 2 which are weldments to be welded is prepared and the weld zone welded by single butt welding is inspected by a nondestructive inspection such as a radiograph test or an ultrasonic test.

5 Claims, 8 Drawing Sheets

WHEN CONCAVE PORTION EXISTS: WELD ZONE
WITH A COMPLETE PENETRATION(STANDARD SAMPLE)

WHEN CONCAVE PORTION EXISTS: WELD ZONE
WITH WELD LINE DEVIATION

WHEN CONCAVE PORTION EXISTS: WELD ZONE WITH LACK OF PENETRATION

WHEN CONCAVE PORTION DOES NOT EXIST: WELD ZONE WITH WELD LINE DEVIATION

WHEN CONCAVE PORTION DOES NOT EXIST:
WELD ZONE WITH LACK OF PENETRATION

WHEN CONCAVE PORTION EXISTS: WELD ZONE
WITH A COMPLETE PENETRATION(STANDARD SAMPLE)

WHEN CONCAVE PORTION EXISTS: WELD ZONE
WITH WELD LINE DEVIATION

WHEN CONCAVE PORTION EXISTS: WELD ZONE WITH LACK OF PENETRATION

WHEN CONCAVE PORTION DOES NOT EXIST: WELD ZONE WITH WELD LINE DEVIATION

WHEN CONCAVE PORTION DOES NOT EXIST:
WELD ZONE WITH LACK OF PENETRATION

GROOVE SHAPE FOR SINGLE BUTT WELDING AND INSPECTION METHOD OF WELD ZONE THEREOF

BACKGROUND OF THE INVENTION

1. Field of the Invention

The present invention relates to a groove shape of welded structure welded by using single butt welding and an inspection method of a weld zone for inspecting the weld zone welded by the single butt welding in a nondestructive state and particularly to a groove shape and an inspection method capable of being appropriately adapted for welding a structure having a hollow portion.

2. Description of the Prior Art

Conventionally, in carrying out a single butt welding, a welding has been carried out by working a groove shape into a shape such as square groove, single V groove, single bevel groove, single J groove, single U groove or the like. However, if a surface of a welding heat source side of a groove portion and a surface of an opposite side thereof, that is to say, a surface of a lower surface side of the groove (hereinafter, referred to as a surface of a lower surface side of a groove) remain not welded when the welding is carried out with those groove shapes, it causes a lack of strength or becomes a cause of crevice corrosion and moreover, in welding a pipe for supplying a gas used in a field of semiconductor manufacturing industry or the like, it makes very microscopic particles, such as metal particles or the like, accompanied in a supplied gas to raise a problem to produce inferior goods.

The cause of the above-mentioned problem may be expected that, for example, weld line deviation is caused by wrong establishment and manipulation in arc aiming during welding such that penetration bead does not reach a surface of a lower surface side of the groove of a butt portion and the groove remains, or a complete penetration is not accomplished due to wrong establishment of welding conditions such that the groove on the surface of the lower surface side of the groove remains.

Furthermore, in case of butt welding different kinds of metals, since an amount of complete penetration of each metal is different due to a difference in melting point of molten metal, for example, even though a welding is accurately carried out along a weld line, biased penetration where weld metal is biased to a metal of one side may be created such that the groove on the surface of the lower surface side of the groove remains to thereby cause an inferior welding.

Further, even though same metals are welded by the butt welding, since surface tension of molten metal is different due to a difference in impurity content of each metal, there is a disadvantage that weld metal is biased to a weldment of one side, similarly to the case where the different metals are welded by the butt welding.

Because of the above-mentioned problem, to determine whether there remains a flaw by the welding in the weldments or not, a state of an inside surface of a weld zone has been generally inspected by the naked eye after carrying out the welding. However, a nondestructive inspection needs to be carried out for a kind of weld structure having a hollow portion, such as a pipe, a pressurization container and a pillar having a box-shaped cross section used in a steel frame for construction, which are hard to be inspected by the naked eye.

As the nondestructive inspection method, an ultrasonic test and a radiograph test have been generally adopted. However, when a butt surface is relatively flat, even though the groove of the surface of the lower surface side of the groove remains by any cause, there is case wherein the remaining grooves stick to each other by solidification shrinkage stress of the weld zone.

Since a difference in a transmission amount of radioactive rays is small due to close adherence of a gap in a radiograph test, it is difficult to obtain a clear difference of concentration which can be used in inspection of the flaw.

Furthermore, in an inspection by the ultrasonic test, since ultrasonic wave transmits through the closely adhered groove portion, there is a problem that sufficient S/N ratio can not be obtained.

Particularly, in the ultrasonic test of the weld zone of the weldment made of an austenite-based stainless steel, there is a problem that a small noise referred to as a forest-shaped echo by coarse columnar crystal is generated to make S/N ratio to be more lowered. Further, since the forest-shaped echoes become a bigger pseudo echo if they are overlapped, it is almost impossible to distinguish it from a reflection echo which is from a fine remaining butt portion.

Furthermore, if welding is carried out by leaving an opening between root faces in order to prevent close adherence of the groove portion which remains not melted, generation of the above-mentioned problems may be decreased. However, since it takes very much time to establish equally an opening between the root faces with a high accuracy and moreover, burn through or incomplete fusion or the like are easy to be generated, very high welding technique and skillfulness have been required. Particularly, in circumferential automatic TIG welding where a thin pipe is welded without using a filler metal, such a problem becomes considerable and it is very difficult to weld with leaving a root opening so that the welding had to be carried out in a state without the root opening. Furthermore, in case that a root face is coarse, the above mentioned problem may be reduced, however, in that case, since there are many cavities on a butt portion, a weld flaw such as generation of blowhole becomes easy to be generated.

SUMMARY OF THE INVENTION

An object of the present invention taking the above-mentioned problems into account is to provide a groove shape capable of securely inspecting and estimating a flaw due to existence of the groove on a surface of a lower surface side of the groove, which is generated due to an incomplete penetration, a weld line deviation, existence of different kinds of metals or impurities, by a nondestructive inspection such as an ultrasonic test or a radiograph test, without establishing a root opening requiring a high level of welding skill in single butt welding, and another object according to the present invention is to provide an inspection method capable of securely inspecting and estimating the flaw of a single butt weld zone.

In order to accomplish the above-mentioned object, according to claim 1 of the present invention, a groove shape for single butt welding in carrying out the single butt welding by a fusion welding method using a filler metal, comprising: a concave portion having a depth and a width formed on butt surfaces of weldments to be welded by the single butt welding, wherein the depth(D) along a thickness of the concave portion is within a range of 1 through 50% of a thickness of the weldments; and the width(2W) of the concave portion concaved to both sides interpositioning a butt portion formed on groove surfaces therebetween is within a range of about 1 through 60% of a predetermined width of a formed penetration bead such that the concave portion does not remain after the single butt welding, is provided.

Furthermore, according to claim 2 of the present invention, a groove shape for single butt welding in carrying out the single butt welding by a fusion welding method using non filler metal comprising: a concave portion having a depth and a width formed on butt surfaces of weldments to be welded by the single butt welding, wherein the width (2W) of the concave portion concaved to both sides interpositioning a butt portion formed on groove surfaces therebetween is within a range of about 1 through 40% of a predetermined width of a formed penetration bead; and the depth(D) of a thickness direction is 7% and less of a metal volume of a weld zone such that the concave portion does not remain after the single butt welding, is provided.

Furthermore, according to claim 3 of the present invention, the groove shape for single butt welding according to claims 1 or 2, wherein a portion of the concave portion faces toward a surface of a welding heat source side and a surface of an opposite side thereof, is provided.

Furthermore, according to claim 4 of the present invention, the groove shape for single butt welding according to any one of claims 1 to 3, wherein the weldment is a pipe, is provided.

Furthermore, according to claim 5 of the present invention, the groove shape for single butt welding according to any one of claims 1 to 4, wherein the weldment is material of an austenite-based stainless steel pipe, is provided.

Furthermore, according to claim 6 of the present invention, an inspection method of single butt weld zone comprising the steps of: a step for forming a concave portion having a width and a depth on a butt surface of at least one side of weldments where a single butt welding is carried out by a fusion welding method using a filler metal, wherein the width(2W) of the concave portion concaved to both sides interposioning a butt portion formed on groove surfaces therebetween is within a range of about 1 through 60% of a predetermined width of a formed penetration bead and the depth(D) along a thickness of the concave portion is within a range of 1 through 50% of a thickness of the weldments; a step for carrying out the single butt welding such that the concave portion does not remain after the single butt welding; and a step for inspecting the single butt weld zone by an ultrasonic test, is provided.

Furthermore, according to claim 7 of the present invention, an inspection method of single butt weld zone comprising the steps of: a step for forming a concave portion having a width and a depth on a butt surface of at least one side of weldments where a single butt welding is carried out by a fusion welding method using a non filler metal, wherein the width(2W) of the concave portion concaved to both sides interposing a butt portion formed on groove surfaces therebetween is within a range of about 1 through 40% of a predetermined width of a formed peneration bead and the depth(D) of a thickness direction is 7% and less of a metal volume of a weld zone; a step for carrying out the single butt welding such that the concave portion does not remain after the single butt welding; and a step for inspecting the single butt weld zone by an ultrasonic test, is provided.

Furthermore, according to claim 8 of the present invention, an inspection method of single butt weld zone comprising the steps of: a step for forming a concave portion having a width and a depth on a butt surface of at least one side of weldments where a single butt welding is carried out by a fusion welding method using a filler metal, wherein the width(2W) of the concave portion concaved to both sides interposioning a butt portion formed on groove surfaces therebetween is within a range of about 1 through 60% of a predetermined width of a formed peneration bead and the depth(D) along a thickness of the concave portion is within a range of 1 through 50% of a thickness of the weldments; a step for carrying out the single butt welding such that the concave portion does not remain after the single butt welding; and a step for inspecting the single butt weld zone by a radiograph test, is provided.

Furthermore, according to claim 9 of the present invention, an inspection method of single butt weld zone comprising the steps of: a step for forming a concave portion having a width and a depth on a butt surface of at least one side of weldments where a single butt welding is carried out by a fusion welding method using a non filler metal, wherein the width(2W) of the concave portion concaved to both sides interpositioning a butt portion formed on groove surfaces therebetween is within a range of about 1 through 40% of a predetermined width of a formed penetration bead and the depth(D) of a thickness direction is 7% and less of a metal volume of a weld zone; a step for carrying out the single butt welding such that the concave portion does not remain after the single butt welding; and a step for inspecting the single butt weld zone by an ultrasonic test, is provided.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

The first characteristic according to the present invention is a shape of a groove portion for single butt welding where a concave portion which can be recognized by a radiograph test and an ultrasonic test is formed on a butt surface thereof. Further, the second characteristic according to the present invention is an inspection method of a single butt weld zone, where a flaw portion of the weld zone can be very securely recognized by nondestructive inspection, such as the radiograph test or the ultrasonic test, after forming the concave portion on the butt surface of a weldment and welding it.

Figure 1:
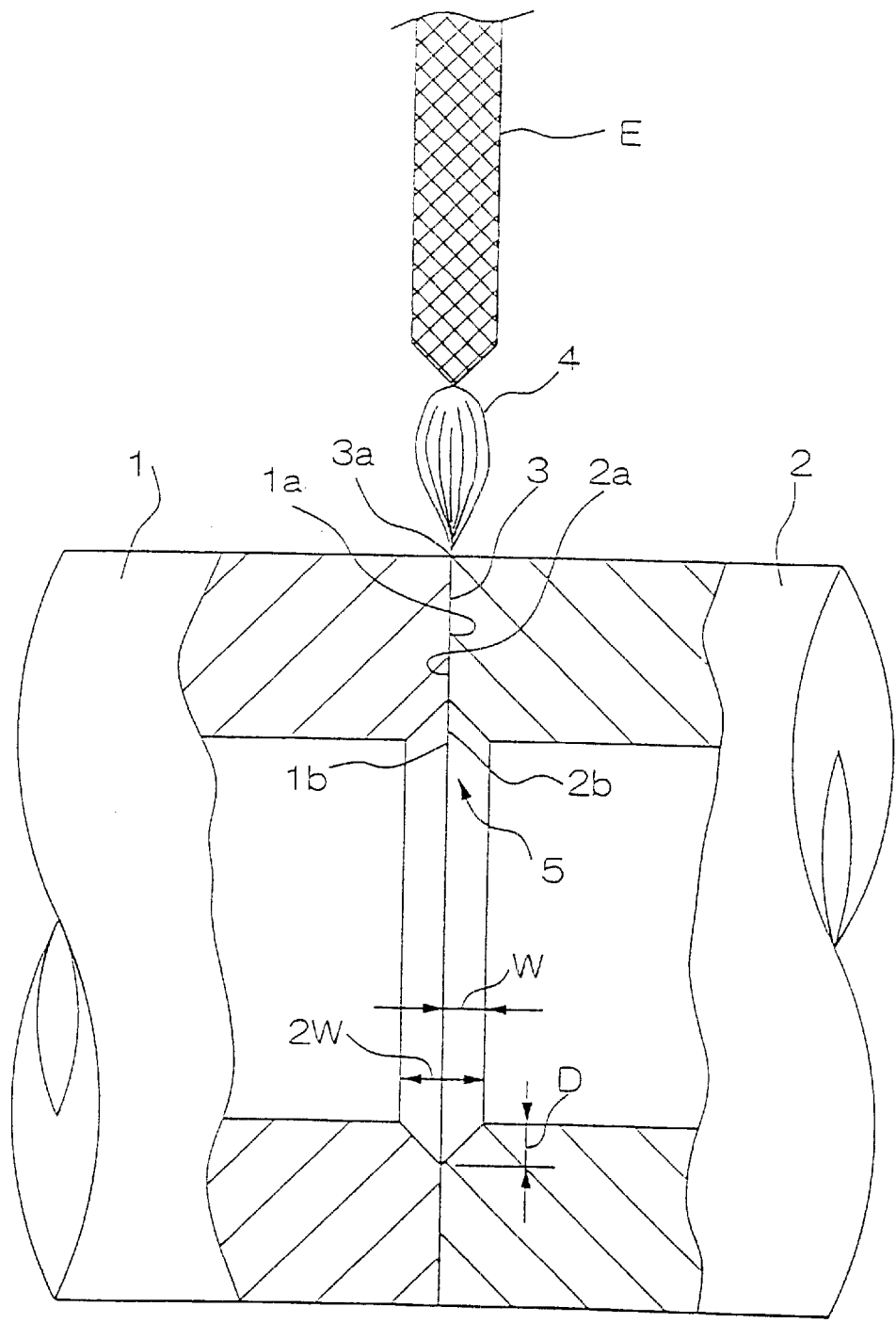
FIG. 1 is a partial cross-sectional view illustrating the first embodiment of a groove portion for single butt welding according to the present invention.

FIG. 1 is a partial cross-sectional view illustrating the first embodiment of the groove portion for single butt welding according to the present invention. In FIG. 1, a pipe 1 and a pipe 2, each having a square groove, butt to each other at a groove surface 1a and a groove surface 2a to form a butt portion 3. Then, an arc 4 is generated by an electrode of an arc welding machine, such as a TIG welding machine or a MIG welding machine, along an outer wall 3a of the butt portion 3 and the butt portion 3 is penetrated by the arc 4 such that the groove surface 1a of the pipe 1 and the groove surface 2a of the pipe 2 are melted to thereby be joined.

Then, in the present invention, the concave portion 5 is formed on the butt surface 1b of the groove surface on the inner surface of the pipe 1 and the butt surface 2b of the groove surface on the inner surface of the pipe 2, and not on the outer surface of pipe 1 and pipe 2, which form the above-mentioned butt portion 3. In FIG. 1, the concave portion 5 having single V groove defined by the butt surface 1b of the pipe 1 and the butt surface 2b of pipe 2, is formed. Furthermore, a shape and a dimension of the concave portion 5 vary according to variation of a thickness of the weldment or a shape of the weld zone to be made and a welding method. In case of a fusion welding using a filler metal, such a a MAG welding and a MIG welding, it is preferred to be formed such that a depth (D) along a thickness of the concave portion 5 is within a range of 1 through 50% of a thickness of the weldments and a width (2W) of the concave portion 5 concaved to both sides interpositioning the butt portion 3 formed on groove surfaces 1a, 2a therebetween is within a range of about 1 through 60% of a predetermined width of a formed penetration bead.

Figure 2:
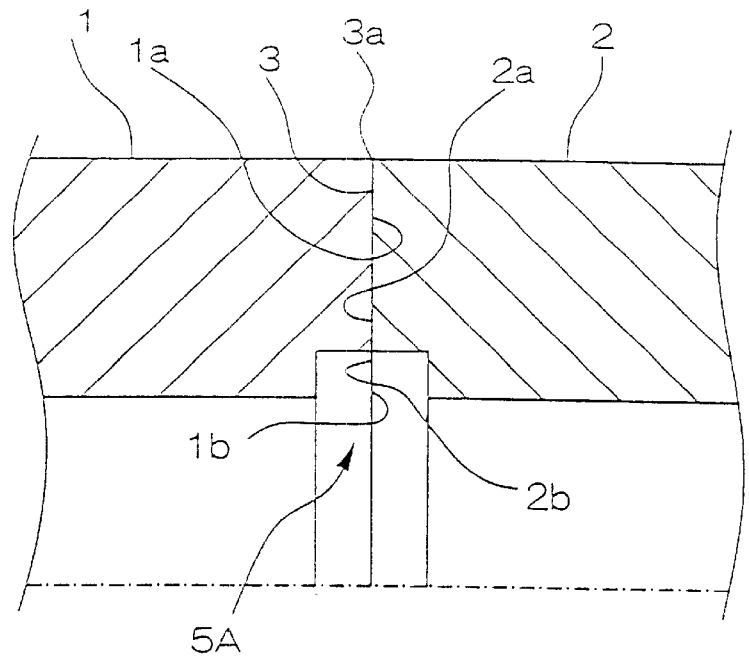
FIG. 2 is a cross-sectional view illustrating a concave shape formed on a butt surface of the second embodiment of the groove portion for single butt welding according to the present invention.
Figure 3:
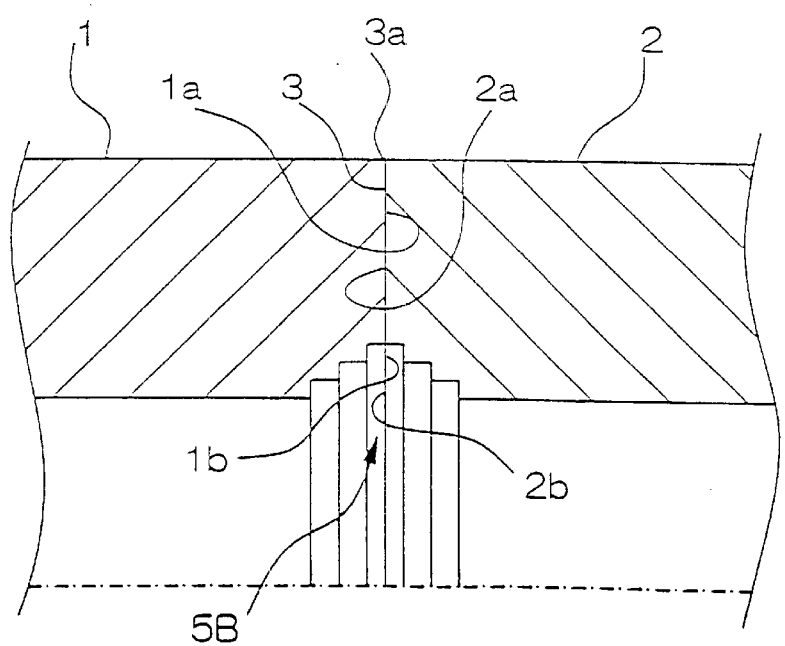
FIG. 3 is a cross-sectional view illustrating a concave shape formed on the butt surface of the third embodiment of the groove portion for single butt welding according to the present invention.

Furthermore, a dimension of the concave portion 5 shown in FIG. 2 and FIG. 3 is preferred to be formed similarly to FIG. 1 such that the depth(D) along the thickness of the concave portion 5 is within a range of 1 through 50% of the thickness of the weldments and the width(2W) of the concave portion 5 concaved to both sides interpositioning the butt portion 3 formed on the groove surfaces 1a,2a therebetween is within a range of about 1 through 60% of a predetermined width of the formed penetration bead.

Furthermore, the concave portion doesn't have to be provided on the both sides of the groove surfaces 1a, 2a and may be provided on the only one side thereof. In this case, it is preferred to form such that the depth(D) along the thickness of the concave portion is within a range of 1 through 50% of the thickness of the weldments and the width(W) of the concave portion 5 is within a range of about 1 through 30% of the predetermined width of the formed penetration bead.

It is possible to weld such that the concave portion doesn't remain in an inner weld surface after welding with the above-mentioned dimension.

Furthermore, in case of a fusion welding using non filler metal such as a TIG welding, a laser welding and a plasma welding, where a filler metal is not used, since it is impossible to fill up an amount of missing volume of the concave portion 5 with the filler metal, the thickness of the weld zone becomes thin resulting in lack of strength. However, in this case, it is preferable to have a dimension forming a volume of the concave portion 5 such that the dimension of the width(2W) of the concave portion 5 is set to be within a range of 1 through 40% of the width of the penetration bead formed by the welding and the dimension of the depth(D) of the concave portion 5 is 7% and less of metal volume of the weld zone. Thus, if welded with these dimensions, there is no such a case where the thickness of the metal in the weld zone becomes thin, since it is offset due to a phenomenon of thickness increase during solidification shrinkage or the like.

Furthermore, a dimension of the concave portion shown in FIG. 2 and FIG. 3 is preferred to be formed similarly to FIG. 1 such that the width(2W) of the concave portion 5 concaved to both sides interpositioning the butt portion 3 formed on the groove surfaces 1a,2a, therebetween is within a range of about 1 through 40% of a predetermined width of the formed penetration bead and the depth(D) along the thickness direction is 7% and less of the metal volume of the weld zone.

Furthermore, the concave portion doesn't have to be provided on the both sides of the groove surfaces 1a, 2a and may be provided on the only one side thereof. In this case, it is preferred to be formed such that the depth(D) along the thickness direction is 7% and less of the metal volume of the weld zone and the width(W) of the concave portion 5 is within a range of about 1 through 20% of the predetermined width of the formed penetration bead.

It is possible to weld such that the concave portion doesn't remain in an inner weld surface after the welding with the above-mentioned dimension.

The shape of the concave portion 5 is shown in FIG. 1 as the concave portion having a single V groove where a tapered surface is formed toward inside of the weld zone of the weldment, with making one side of the butt surfaces 1b and 2b of the weldments as cardinal points. However, the shape of the concave portion is not limited to this and a shape of the second embodiment where single U groove of concave portion 5A is formed as shown in FIG. 2 may be possible and moreover, a shape of the third embodiment where a shape of concave portion 5B has steps as shown in FIG. 3 may be possible. The above-mentioned shapes can be appropriately chosen and used according to a shape and a thickness of the weldments and a welding method. Furthermore, in FIG. 2 and FIG. 3, for the same part as in the first embodiment shown in FIG. 1, the same reference numeral will be used and the detailed description is omitted.

The concave portions 5, 5A and 5B, thus formed (hereinafter, always represented with a reference numeral 5 except for the case where a special direction is required) remain as they were, in case that these are not melted during welding.

Therefore, in the radiograph test by using the concave portion, an X-ray picture thereof is taken such that a concentration difference becomes very clear. Furthermore, in the ultrasonic test, the concave portion becomes a portion of a very effective reflection source without transmission of an ultrasonic wave so that it is possible to obtain very clearly S/N ratio. Furthermore, in the ultrasonic test, in case that a reflection angle of a probe used can be recognized in advance, if a taper angle of the concave portion 5 is formed corresponding to the reflection angle, it is possible to obtain the clear signal of S/N ratio appropriate in determining existence of a flaw.

Furthermore, in case that the butt portion 3 can be welded in a state of a complete melting, since the concave portion 5 formed on the butt surfaces 1b, 2b is filled up with molten metal by the welding, a predetermined strength may be obtained in the weld zone and moreover, it doesn't become a cause to generate a crevice corrosion or particles. Furthermore, a portion of the concave portion 5 is made to face toward an inner surface of the groove surfaces 1a or 1b, working becomes easier. Furthermore, the concave portion 5 does not have to be formed over the both of the butt surfaces 1b, 2b of the engaging weldments and may be formed on at least one side of the butt surfaces.

PREFERRED EMBODIMENTS

Next, as embodiments, the following sample for a test was made by forming the above-mentioned groove shape for single butt welding according to the present invention on weldments and by welding with changing welding conditions.
(Common conditions)
Weldment: stainless steel pipe (made of SUS316L) having an outer diameter of ⅜ inch and a thickness of 1 mm.
Working shape of concave portion 5: single V groove of concave portion as shown in FIG. 1, was made such that the depth (D) thereof is to be 0.2 mm and the width(2W) thereof is to be 0.4 mm.
Welding method: carried out by circumferential automatic TIC welding(without using a filler metal).
Shape of the groove surface: the groove surface was made into square groove.

embodiment 1

As an embodiment 1, the groove having the single V groove of concave portion 5 as shown in FIG. 1 was made and the single butt welding was carried with the above-mentioned common conditions. In the welding, a sample (standard sample) having an outer bead width of 3 mm and an inner bead width of 2 mm, which was welded with a complete penetration, was made.

embodiment 2

As an embodiment 2, the groove having the single V groove of concave portion 5 as shown in FIG. 1 was made and the single butt welding was carried out with the above-mentioned common conditions. In the welding, a sample (weld sample with weld line deviation and lack of penetration) which was welded such that even though the weld line was made to deviate from the root face by 1.2 mm and weld metal reached an inside surface of a pipe, a height of remaining groove (a height of not welded portion) was to be 0.5 mm, was made.

embodiment 3

As an embodiment 3, the groove having the single V groove of concave portion 5 as shown in FIG. 1 was made and the single butt welding was carried out with the above-mentioned common conditions. In the welding, a sample(a weld sample with lack of penetration) which was welded such that the lack of penetration of 0.5 mm is to be generated, was made.

In order for comparing with the samples of the above-mentioned embodiments of 1 to 3, as a comparative example, samples for comparison welded by the single butt welding was made by a conventional groove where the concave portion was not provide in the butt surface thereof. Common welding conditions were the same as in the above-mentioned embodiment excluding that the butt surface was not provided with the concave portion.

Comparative example 1

As a comparative example 1, the groove shape was made into square groove and the single butt welding was carried out. In the welding, as in the embodiment 2, a sample (weld sample with weld line deviation and lack of penetration) which was welded such that even though the weld line was made to deviate from the root face by 1.2 mm and weld metal reached the inside surface of the pipe, the height of remaining groove (height of not welded portion) was to be 0.5 mm, was made.

Comparative example 2

As a comparative example 2, the groove shape was made into square groove and the single butt welding was carried out. In the welding, as in the embodiment 3, a sample(weld sample with lack of penetration) welded such that the lack of penetration of 0.5 mm is to be generated, was made.

Next, for the respective samples made based on the present invention in the above-mentioned embodiments of 1 to 3 where the pipe, the weldment provided with the concave portion 5 on the butt surface, was welded by the single butt welding and for the respective samples made in the above-mentioned comparative examples where the pipe, the weldment having a conventional groove not provided with a concave portion 5, was welded by the single butt welding, respective experiments of an ultrasonic test(experiment 1), a radiograph test(experiment 2) and a tension test(experiment 3) were carried out as follows.

Experiment 1

As an experiment 1, the ultrasonic test was carried out to the weld portion of the respective samples welded by the single butt welding in the groove shape of the present invention made in the above-mentioned embodiments of 1 to 3 and to the weld portion of the respective samples welded by the single butt welding in the conventional grooves of the comparative example 1 and the comparative example 2. The ultrasonic test was carried out by the following apparatus and conditions.

Ultrasonic inspection apparatus: USIP-11 type made by KRAUTKRAMER JAPAN COMPANY LIMITED.

Test frequency: 5 Mhz.

Dimension of oscillator: 5 mm 3 3 mm.

Applied ultrasonic wave: transverse wave with reflection angle of 70 degree

Contact medium: glycerin paste.

The results of the ultrasonic test are shown with echo graphs of ultrasonic wave flaw detection of FIG. 4 to FIG. 8(hereinafter, referred to as echo graph). That is to say, FIG. 4 is an echo graph, which was made in the first embodiment, of a standard sample welded in a state of an complete penetration and FIG. 5 is an echo graph, which was made in the second embodiment, of a sample(weld sample with weld line deviation and lack of penetration) and FIG. 6 is an echo graph, which was made in the third embodiment, of a sample (weld sample with lack of penetration).

Figure 7:
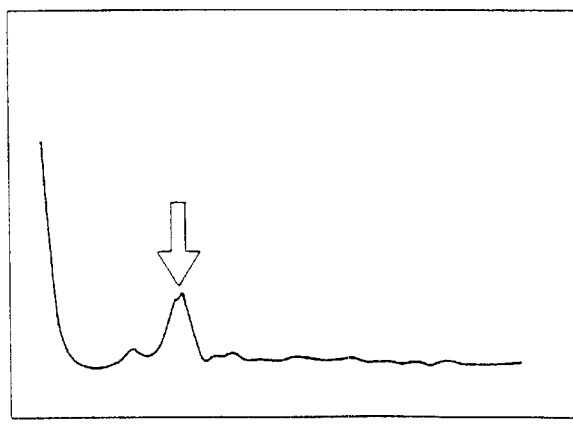
FIG. 7 is an echo graph, which is made in the first comparative example, of the ultrasonic test of a sample welded in a state of lack of penetration and weld line deviation in groove not having the concave portion formed on the butt surface thereof.
Figure 8:
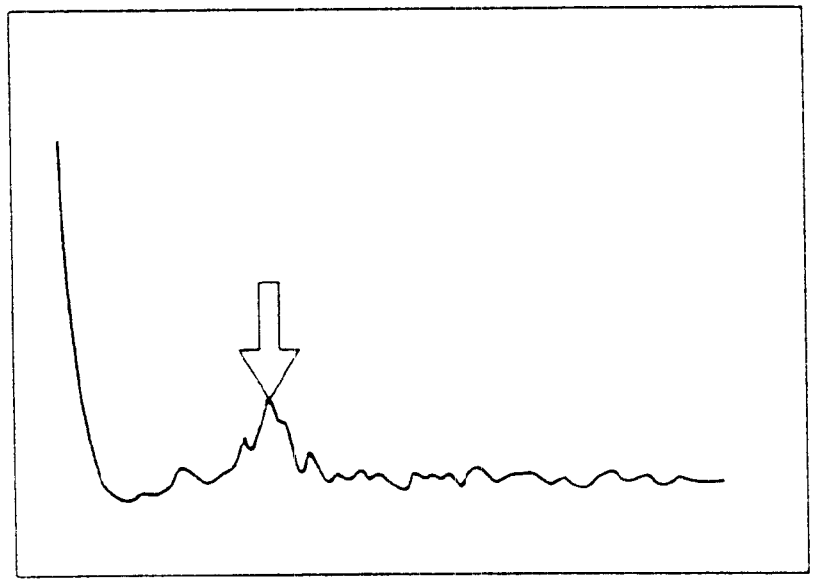
FIG. 8 is an echo graph, which is made in the second comparative example, of the ultrasonic test of a sample welded in a state lack of penetration in the groove not having the concave portion formed on the butt surface thereof.

FIG. 7 is an echo graph of a sample(weld sample with a weld line deviation and lack of penetration) made in the comparative example 1 and FIG. 8 is an echo graph of a sample(weld sample with lack of penetration) made in the comparative example 2.

Figure 4:
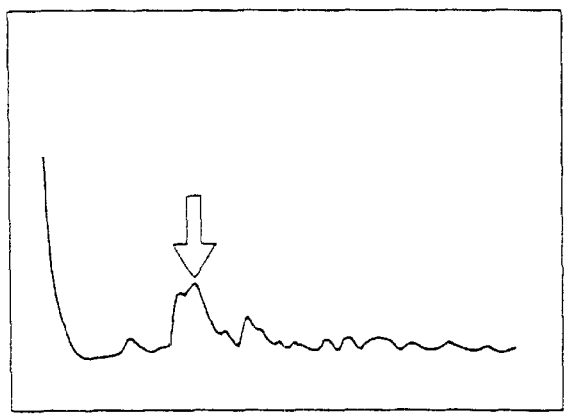
FIG. 4 is an echo graph, which is made in the first embodiment, of an ultrasonic test of a standard sample welded in a state of an complete penetration in the groove formed with a concave portion on a butt surface thereof.
Figure 5:
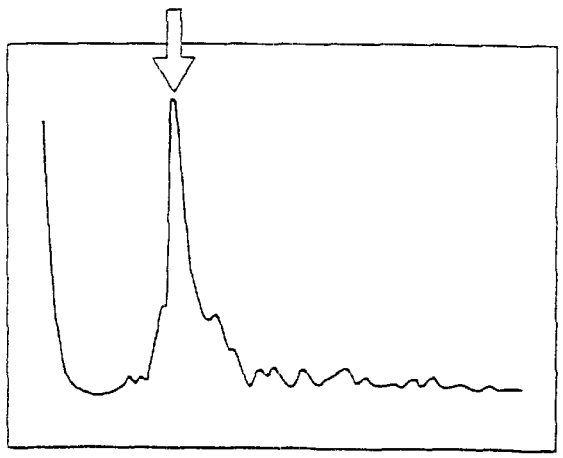
FIG. 5 is an echo graph, which is made in the second embodiment, of the ultrasonic test of a sample welded in a state of lack of penetration and weld line deviation in the groove formed with the concave portion on the butt surface thereof.
Figure 6:
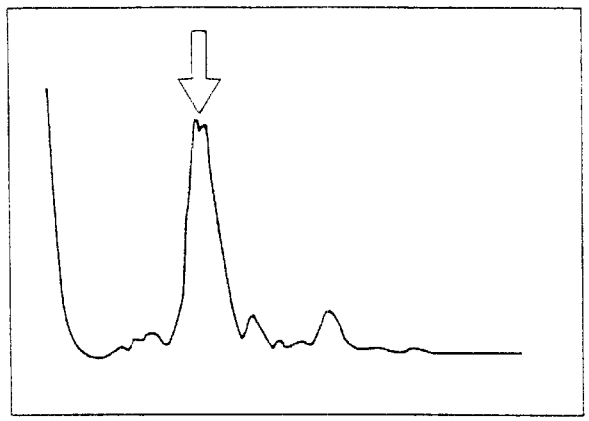
FIG. 6 is an echo graph, which is made in the third embodiment, of an ultrasonic test of a sample welded in a state of lack of penetration in the groove formed with the concave portion on the butt surface thereof.

As apparent in the echo graphs shown in FIG. 4 to FIG. 8, the echo graph of the each sample of the embodiment 2 and embodiment 3 where the welding was carried out in a state having a flaw of lack of penetration by carrying out the single butt welding in the groove formed with the concave portion 5 on the butt surface, based on the present invention, has a very conspicuous change of wave form as shown in FIG. 5 and FIG. 6. If the FIG. 5 and the FIG. 6 are compared with the FIG. 4 of the standard sample welded in a state of the complete penetration of the embodiment 1, heights of the echoes of the FIG. 5 and FIG. 6 are higher than the height of echo of the FIG. 4 by about 5 dB or more. Therefore, from the fact that it is possible to recognize that the wave form of the echo graph of the weld zone having the weld flaw as shown in the FIG. 5 and the FIG. 6 shows a big difference from a wave form of a normal and standard weld zone, if the single butt welding is carried out by providing the concave portion on the butt surface based on the present invention, it was confirmed that it is possible to obtain S/N signal which makes it possible for recognition of the existence of the weld flaw to be very easily and securely made by the ultrasonic test.

On the other hand, in FIG. 7 and FIG. 8 showing echo graphs of the respective samples having the weld flaw of the comparative example 1 and comparative example 2, where the single butt welding was carried out in the conventional groove with the concave portion not formed on the butt surface, since the wave form thereof doesn't show a change enough to be recognized from the wave form of FIG. 4 which is an echo graph of the standard sample of the embodiment 1, the weld flaw thereof couldn't be found.

Furthermore, in the ultrasonic test, it was confirmed that the concave portion provided on the butt surface of the pipe is preferred to be formed as the concave portion having a single V groove cross-section where in FIG. 1 the width (2W)of the surface of the lower surface side of the groove is 0.4 mm and an intersection point of the butt surface and the inner surface of the pipe(the surface of the lower surface side of the groove) forms a right angle and, which made as an right-angled isosceles triangle composed of two edges of 0.2 mm (=depth(D)=width(2W)/2). Furthermore, since it is impossible to fill up the amount of volume of the concave portion in the case that TIG welding without using a filler metal is carried out, a thickness of the weld metal becomes thin as much as the amount of volume resulting in lack of strength. However, in this case, it was confirmed that the amount of the thickness shortage is offset by a thickness increase according to solidification shrinkage such that the problem that the thickness of the weld metal becomes thin was solved, if the concave portion was formed such that the volume thereof is set to be within 5% of the volume of the weld metal.

Experiment 2

As an experiment 2, the radiograph test was carried out to the weld portion of the respective samples welded by the single butt welding in the groove shape of the present invention made in the above-mentioned embodiments of 1 to 3 and to the weld portion of the respective samples welded by the single butt welding in the conventional grooves of the comparative example 1 and the comparative example 2. The radiograph test was carried out by the following apparatus and the conditions.

Radiograph test apparatus: RIX200C made by RIKOH Corporation.

Inspection method: method for photographing one side of a double wall.

Penetrameter: S01.

Film focal distance: 1200 mm.

Tube voltage: 175 Kv.

Tube current: 5 mA.

Exposure time: 60 seconds.

Figure 9:
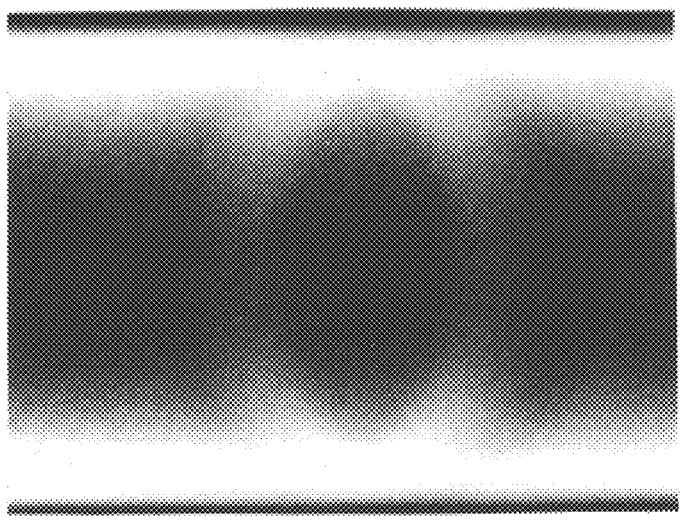
FIG. 9 is an X-ray picture, which is made in the first embodiment, of a standard sample welded in a state of the complete penetration in the groove formed with the concave portion on the butt surface thereof.
Figure 10:
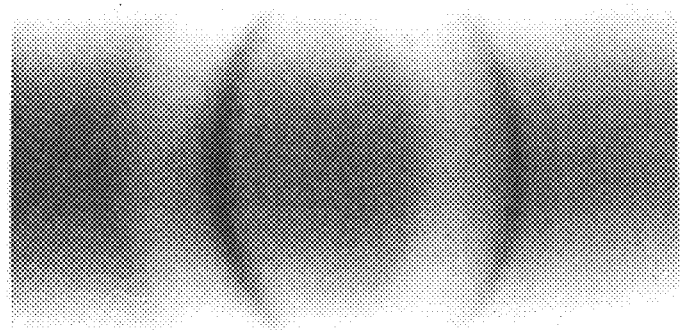
FIG. 10 is an X-ray picture, which is made in the second embodiment, of a sample welded in a state of lack of penetration and weld line deviation in the groove formed with the concave portion on the butt surface thereof.
Figure 11:
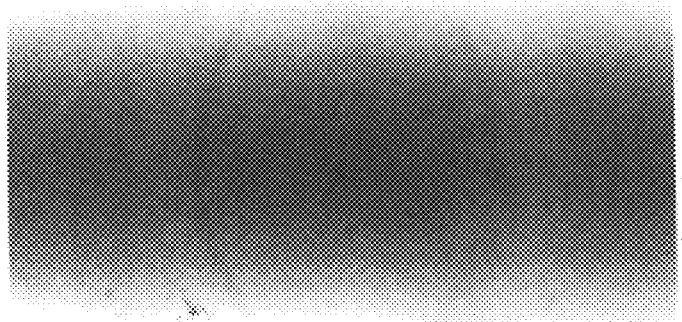
FIG. 11 is an X-ray picture, which is made in the third embodiment, of a sample welded in a state of lack of penetration in the groove formed with the concave portion on the butt surface thereof.

FIG. 9 to FIG. 13 are X-ray pictures showing the results of the radiograph test. That is to say, FIG. 9 is an X-ray picture, which was made in the first embodiment, of a standard sample welded in a state of the complete penetration and FIG. 10 is an X-ray picture, which was made in the second embodiment, of a sample(weld sample with weld line deviation and lack of penetration) and FIG. 11 is an X-ray picture, which was made in the third embodiment, of a sample(weld sample with lack of penetration).

Figure 12:
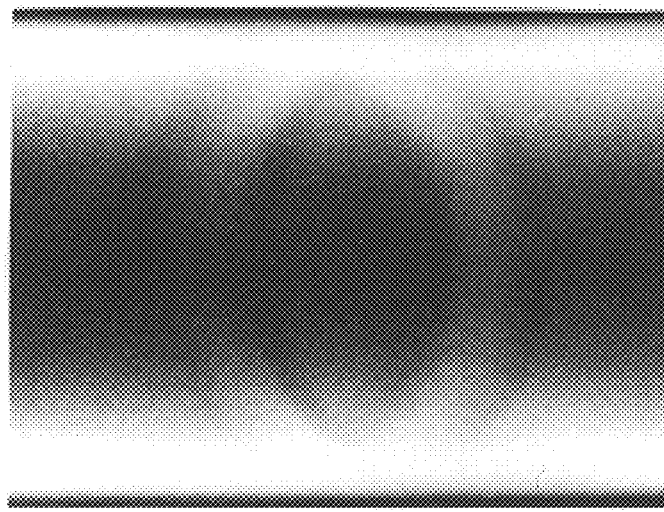
FIG. 12 is an X-ray picture, which is made in the first comparative example, of a sample welded in a state of lack of penetration and weld line deviation in the groove not having the concave portion formed on the butt surface thereof.
Figure 13:
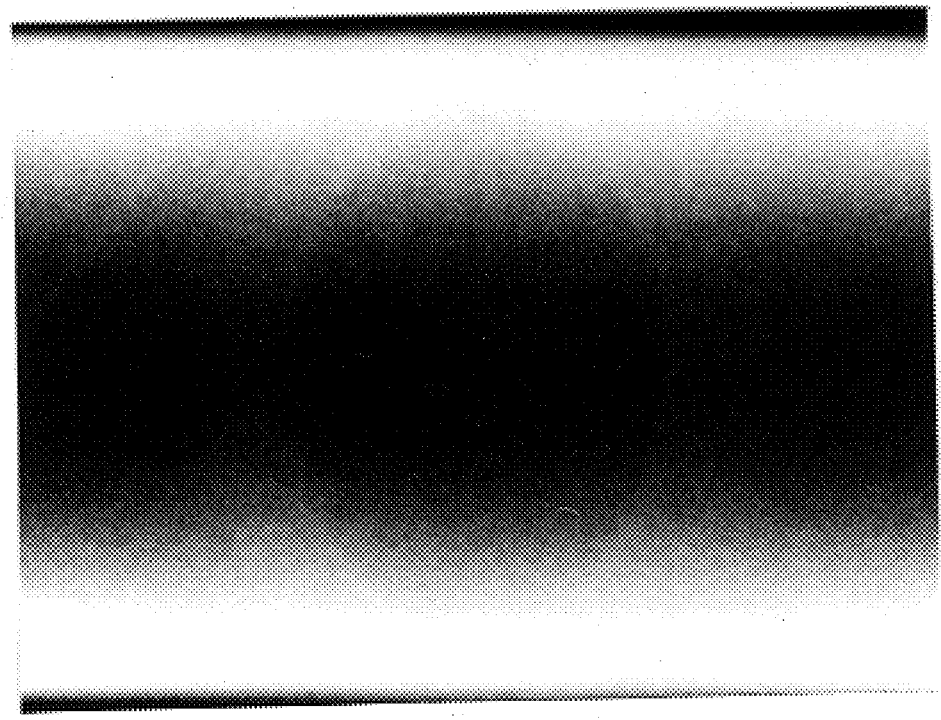
FIG. 13 is an X-ray picture, which is made in the second comparative example, of a sample welded in a state of lack of penetration in the groove not having the concave portion formed on the butt surface thereof.

FIG. 12 is an X-ray picture, which is made in the first comparative example, of a sample(weld sample with weld line deviation and lack of penetration) and FIG. 13 is an X-ray picture, which is made in the second comparative example, of a sample (weld sample with lack of penetration).

As apparent in the X-ray pictures shown in FIG. 9 to FIG. 13, in the X-ray picture of each sample of the embodiment 2 and embodiment 3 where the welding was carried out in a welding state having the flaw of the weld line deviation or the lack of penetration by carrying out the single butt welding in the groove formed with the concave portion 5 on the butt surface based on the present invention, the concave portion was clearly taken as a black ring shape in the X-ray picture thereof as shown in FIG. 10 and FIG. 11.

If the FIG. 10 and the FIG. 11 are compared with the FIG. 9 which is an X-ray picture of the standard sample of the embodiment 1 where the welding was carried out with the complete penetration, since the X-ray pictures of the samples of the embodiment 2 and the embodiment 3 having the weld flaw of the FIG. 10 and the FIG. 11 were taken such that a shade and shadow of the ring shape(an oval shape) is sharp, and thus it was recognizable that there was a clear difference from the x-ray picture of FIG. 9 of the standard sample of the embodiment 1 where the welding was carried out with the complete penetration. Therefore, if the single butt welding was carried out by providing the concave portion on the butt surface based on the present invention, it was confirmed that the recognition of the existence of the weld flaw can be very easily and securely made with the radiograph test.

On the other hand, in FIG. 12 and FIG. 13 showing X-ray pictures of the respective samples having the weld flaw of the comparative example 1 and comparative example 2, where the single butt welding was carried out in the conventional groove with the concave portion not formed on the butt surface, since the shadow and shade of the ring shape(an oval shape) grew dim to reach an inside and didn't show a concentration difference from the shadow and shade of FIG. 9 which is an X-ray picture of the standard sample of the embodiment 1, it is impossible to recognize the existence of the weld flaw, and thus the weld flaw couldn't be found.

Therefore, if the single butt welding was carried out by providing the concave portion 5 on the butt surface, it was confirmed that the recognition of the existence of the weld flaw by the radiograph test is also as effective as that by the ultrasonic test.

Experiment 3

Next, as an Experiment 3, the tension test of the standard sample which was made in the embodiment 1 where the single butt welding was carried out with a complete penetration by forming the concave portion on the butt surface according to the present invention. Test conditions of the tension test were as follows.

Tension tester: AG-5000 D made by Shimadzu Corp.
Load cell: 5 tons.
Tension speed: 200 mm/min.
Length of test pipe: 700 mm.
Free length of test pipe between grip: 45 mm.
Gap of inserted core metal: 20 mm.
Number of samples: 3.

Tensile strengths of the result obtained from the tension test are shown in chart 1. Furthermore, (a) tensile strength of a pipe itself having the same specification as used in the embodiment 1, and (b) tensile strength a pipe welded in a state of the complete penetration by the single butt welding in the groove without the concave portion formed on the butt surface thereof, are also shown in chart 1 for reference.

Chart 1

| Sample | Tensile strength (kgf/mm$^2$) |
|---|---|
| Standard sample of the embodiment 1 according to the present invention | 53.7 |
| Pipe itself having the same specification as in the embodiment 1 | 54.3 |
| Single butt weld zone, of the pipe having the same specification as in the embodiment 1 and by groove without a concave portion | 53.6 |

As apparent in chart 1, the tensile strength of the standard sample of the embodiment 1 where the welding was carried out in a state of the complete penetration by forming the concave portion on the butt surface, based on the present invention, is 53.7 kgf/mm$^2$. The value of the tensile strength is somewhat smaller than that of the tensile strength of 54.3 kgf/mm$^2$ of the pipe itself having the same specification as in the embodiment 1, however, shows almost the same value of the tensile strength of 53.6 kgf/mm$^2$ of the pipe which was welded in a state of the complete penetration in square groove without the concave portions on the butt surface thereof. Moreover, the value of the tensile strength of 53.7 kgf/mm$^2$ sufficiently satisfy a value of a predetermined tensile strength of 480N/mm$^2$(48.98 kgf/mm$^2$) stipulated in JIS and thus it was confirmed that the tensile strength doesn't have any problem.

The groove shape for single butt welding according to the present invention as above-mentioned, shows an effect in the ultrasonic test and the radiograph test for the weld zone where the single butt welding is carried out by the groove shape, and in addition, it can be appropriately applied to an inspection method such as an eddy current test and a visual inspection using an endoscope where it is difficult to inspect a closely adhered flaw as well.

Furthermore, in the above-mentioned embodiments, an example where the shape of the concave portion of the butt surface uses the single V groove of concave portion shown in FIG. 1, is illustratively described, but the shape of the concave portion of the present invention is not limited to this and may be used by appropriately choosing the concave portions of the shapes as shown in FIG. 2 and FIG. 3 and thus the same effect may be accomplished.

Furthermore, in the above-mentioned embodiments, the concave portion is formed on the groove surface that is the butt surface of the square groove, however, it is possible to obtain same effect by forming the concave portion on the root face that is the butt portion in case of Y-shaped groove. It goes without saying that it is possible to accomplish same effect by forming the concave portion on the butt surface even in case of the respective grooves of single bevel groove, single J groove and single U groove.

The groove shape for the single butt welding and the inspection method of the weld zone according to the present invention are carried out as the aforementioned embodiments and accomplish the following effects.

That is to say, according to the groove shape of the present invention, since the concave portion is formed on the butt surface, it is possible to securely inspect the existence of the flaw portion of the weld zone due to lack of penetration by heat input shortage, the weld line deviation, generation of non-melted zone due to the biased penetration generated during welding different kinds of metals and even in case that end surfaces of the weld zone completely adhere to each other due to the solidification shrinkage, by the nondestructive inspection such as the ultrasonic test and the radiograph test.

Furthermore, by forming the concave portion on the butt surface, there is no need for root opening to be provided and therefore, it is possible to exclude adjustment requiring accuracy such that the adjustment work requiring skillfulness before welding may be excluded and thus, adjustment can be carried out for a short time.

In the ultrasonic test, since it is possible to obtain the large S/N signal, it is possible to carry out the test with automatic operation and moreover, it is possible to shorten time of the inspection and simultaneously, to improve a degree of inspection accuracy.

Furthermore, in the ultrasonic test, since it is possible to obtain sufficiently the large S/N signal, the ultrasonic test may be applied to an conventional inspection of a weld zone of an austenite-based stainless steel where it is difficult to determine the existence of the weld flaw clearly.

Furthermore, in the radiograph test, by forming the concave portion on the butt surface, the difference of shading of a shadow and shade due to a difference in transmission amount of radioactive rays according to the existence of the flaw portion of the weld zone becomes clear and thus it is possible to accomplish an effect capable of recognizing and determining the existence of the weld flaw more precisely.

What is claimed is:

1. A groove shape for single butt welding in carrying out the single butt welding by a fusion welding method using non filler metal, comprising:

a concave portion having a depth and a width formed on butt surfaces of weldments to be welded by the single butt welding, wherein the weldment is a pipe and the concave portion is on the inner surface of the weldments, not on the outer surface of the weldments, and the width (2W) of the concave portion concaved to both sides interpositioning a butt portion formed on groove surfaces therebetween is within a range of about 1 through 40% of a predetermined width of a formed penetration bead; and the depth (D) of a thickness direction is 7% and less of a metal volume of a weld zone such that the concave portion does not remain after the single butt welding.

2. A groove shape for single butt welding in carrying out the single butt welding by a fusion welding method using a filler metal, comprising:

a concave portion having a depth and a width formed on butt surfaces of weldments to be welded by the single butt welding, wherein the weldment is a pipe and the depth (D) along a thickness of the concave portion is within a range of 1 through 50% of a thickness of the weldments; and the width (2W) of the concave portion concaved to both sides interpositioning a butt portion formed on groove surfaces therebetween is within a range of about 1 through 60% of a predetermined width of a formed penetration bead such that the concave portion does not remain after the single butt welding.

3. A groove shape for single butt welding according to claim 2 wherein a portion of the concave portion faces toward a surface of a welding heat source side and a surface of an opposite side thereof.

4. A groove shape for single butt welding in carrying out the single butt welding by a fusion welding method using a filler metal, comprising:

a concave portion having a depth and a width formed on butt surfaces of weldments to be welded by the single butt welding, wherein the weldment is material of an austenite-based steel pipe and the depth (D) along a thickness of the concave portion is within a range of 1 through 50% of a thickness of the weldments; and the width (2W) of the concave portion concaved to both sides interpositioning a butt portion formed on groove surfaces therebetween is within a range of about 1 through 60% of a predetermined width of a formed penetration bead such that the concave portion does not remain after the single butt welding.

5. A groove shape for single butt welding in carrying out the single butt welding by a fusion welding method using non filler metal, comprising:

a concave portion having a depth and a width formed on butt surfaces of weldments to be welded by the single butt welding, wherein the weldment is material of an austenite-based steel pipe and the concave portion is on the inner surface of the weldments, not on the outer surface of the weldments, and the width (2W) of the concave portion concaved to both sides interpositioning a butt portion formed on groove surfaces therebetween is within a range of about 1 through 40% of a predetermined width of a formed penetration bead; and the depth (D) of a thickness direction is 7% and less of a metal volume of a weld zone such that the concave portion does not remain after the single butt welding.

* * * * *